No. 788,310. PATENTED APR. 25, 1905.
S. S. FLEMING.
APPARATUS FOR DISTILLING TURPENTINE.
APPLICATION FILED JULY 28, 1904.
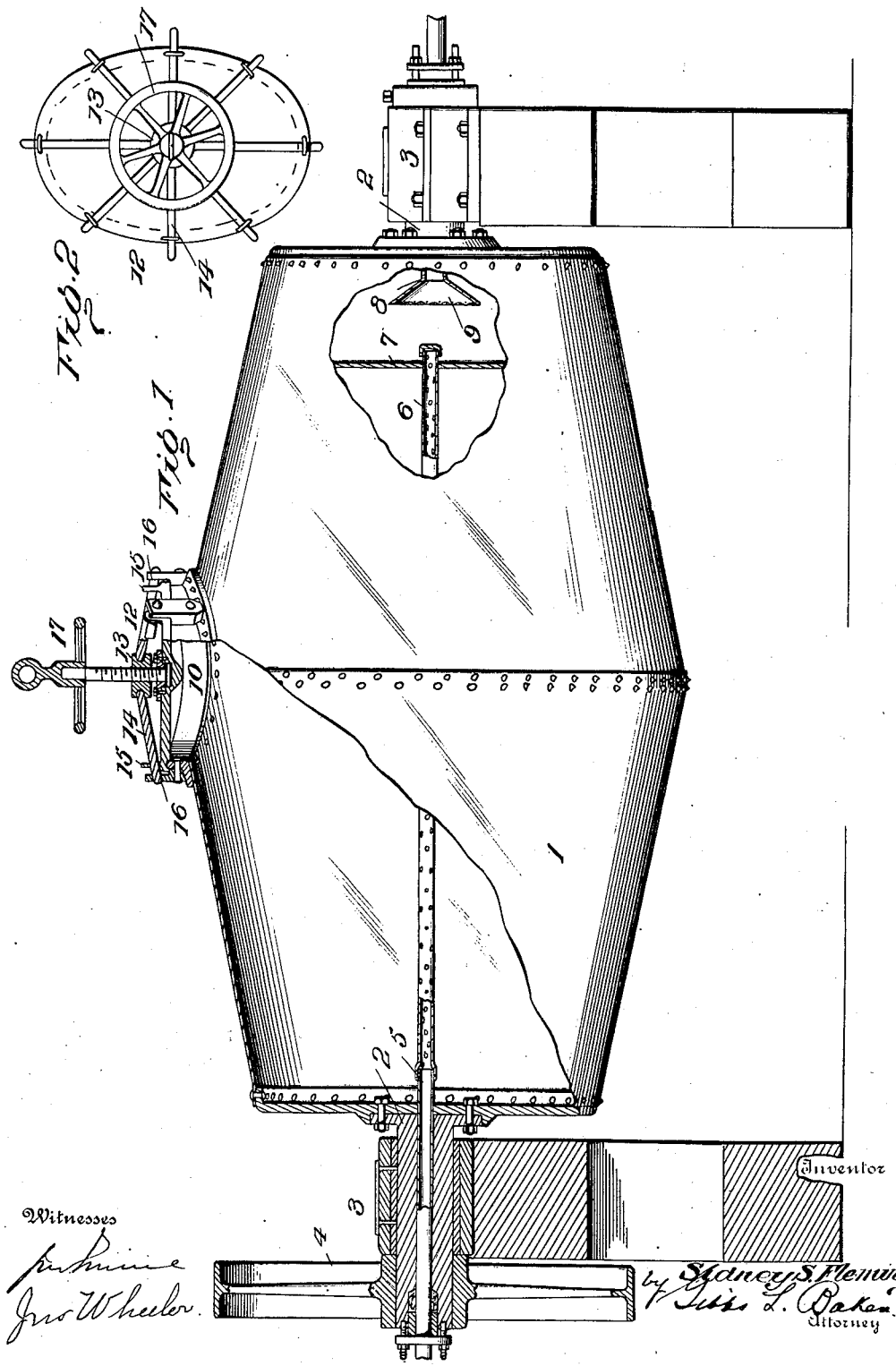
Witnesses
Inventor
Sidney S. Fleming
Attorney No. 788,310.

Patented April 25, 1905.

UNITED STATES PATENT OFFICE.

SIDNEY S. FLEMING, OF BRUNSWICK, GEORGIA.

APPARATUS FOR DISTILLING TURPENTINE.

SPECIFICATION forming part of Letters Patent No. 788,310, dated April 25, 1905.

Application filed July 28, 1904. Serial No. 218,549.

*To all whom it may concern:*

Be it known that I, SIDNEY S. FLEMING, of Brunswick, in the county of Glynn and State of Georgia, have invented certain new and useful Improvements in Apparatus for Distilling Turpentine; and I do hereby declare the following to be a full, clear, and exact description of the invention, such as will enable others skilled in the art to which it appertains to make and use the same.

The object of this invention is to provide simple and highly-efficient means for effecting the distillation of spirits of turpentine under the action of steam and without pressure, avoiding destructive distillation and the extraction of tar and insuring the thorough penetration of the mass of wood by the steam.

The invention will be hereinafter fully set forth, and particularly pointed out in the claim.

In the accompanying drawings, Figure 1 is a side elevation, with parts in section and parts broken away. Fig. 2 is a top plan view of the cover.

Referring to the drawings, 1 indicates a tank or retort of barrel shape, so formed that its bottom always presents inclinations from the ends toward the center. This tank is mounted at its ends on hollow shafts 2, fitted in bearings 3, one of said shafts having a band wheel or pulley 4 secured thereon. Passing transversely through one of these shafts is a steam-supply pipe 5, terminating within the tank in a perforated section 6, extended longitudinally of the tank and supported a short distance from the outlet end of the latter by a brace 7. Extending through the other shaft in axial line with the perforated section 6 of the steam-pipe is an outlet-pipe 8, to the inner funnel-like end of which is secured a strainer 9. At the transverse center of the tank is a charging and discharge opening 10, normally closed by a valve or cover 12. I have shown this cover as equipped with a threaded spindle, whereon works a nut 13, to which are secured several radiating rods 14, designed to engage an upwardly-projecting rib 15 at the periphery of the valve and extend through openings in lugs 16, on shoulders of which the valve is designed to fit, said lugs being rigidly secured to the tank surrounding the opening. A hand-wheel 17 is secured on the spindle, so as to permit of the latter being readily operated to release or secure the valve. The latter may, if desired, be hinged at one side.

In practice the wood, which is ground fine, is supplied to the tank when the opening thereof is at the top, the valve being removed. The quantity of wood so supplied will not quite fill the tank, the object being to allow the wood to roll freely inside when the tank is being rotated, with the result that the steam will pass thoroughly therethrough at every point. In this way I avoid having to resort to pressure to make the steam penetrate the mass of wood, and I likewise avoid the necessity of employing superheated steam, the same objection applying thereto as in the use of the steam under pressure. The vapors of distillation pass off through the strainer and outlet-pipe 8. When it is desired to recharge the tank or retort, the rotation of the latter is stopped when the opening is at the top. The valve is then removed or loosened, and a series of revolutions imparted to the tank, so that the contents will readily fall therefrom each time the opening passes downwardly. By reason of the double truncation or barrel-like formation of the tank or retort all the contents will readily fall outwardly through the discharge-opening.

The advantages of my invention are apparent. A tank or retort constructed in accordance therewith is extremely simple and inexpensive, and the method employed for effecting the distillation of the wood insures the thorough extraction of the turpentine without destructive distillation of the wood and also without the necessity of employing superheated steam. Furthermore, by reason of the tank or retort being of double-truncation formation I am enabled not only to effect a thorough agitation of the mass of wood, but also to maintain it in a loose state, so that it may be penetrated by the steam at every point.

I claim as my invention—

The herein-described apparatus for distilling turpentine from a loose mass of finely-ground wood, comprising a tank or retort of double-truncation formation, axial bearings therefor at the ends thereof, a steam-pipe extending through one end of the tank and longitudinally thereof to near the other end, said pipe being perforated within the tank, an outlet-pipe leading from the other end of the tank in axial line with the steam-inlet pipe and having a funnel-like mouth, a strainer over said mouth, and means for rotating the tank.

In testimony whereof I have signed this specification in the presence of two subscribing witnesses.

SIDNEY S. FLEMING.

Witnesses:
DAVID BOWERS,
C. C. COSBY.